United States Patent
Cohen et al.

(10) Patent No.: US 9,348,111 B2
(45) Date of Patent: May 24, 2016

(54) AUTOMATIC DETECTION OF LENS DEVIATIONS

(75) Inventors: Yohan Yehouda Cohen, Oranit (IL); Alexander Shpunt, Tel Aviv (IL); Benny Pesach, Rosh Ha'ayin (IL); Ronen Deitch, Modl'in (IL)

(73) Assignee: APPLE INC., Cupertino, CA (US)

( * ) Notice: Subject to any disclaimer, the term of this patent is extended or adjusted under 35 U.S.C. 154(b) by 952 days.

(21) Appl. No.: 13/215,235

(22) Filed: Aug. 23, 2011

(65) Prior Publication Data

US 2012/0050488 A1 Mar. 1, 2012

Related U.S. Application Data (60) Provisional application No. 61/376,389, filed on Aug. 24, 2010.

(51) Int. Cl.

| | |
|---|---|
| *G02B 13/00* | (2006.01) |
| *G01M 11/02* | (2006.01) |
| *G02B 13/16* | (2006.01) |
| *G02B 13/18* | (2006.01) |
| *H04N 5/357* | (2011.01) |

(Continued)

(52) U.S. Cl.
CPC .......... *G02B 13/002* (2013.01); *G01M 11/0242* (2013.01); *G01M 11/0264* (2013.01); *G02B 13/16* (2013.01); *G02B 13/18* (2013.01); *G06T 5/006* (2013.01); *H04N 5/3572* (2013.01); *H04N 13/0246* (2013.01); *H04N 17/002* (2013.01); *G01M 11/025* (2013.01); *G01M 11/0221* (2013.01); *G01M 11/0257* (2013.01); *G02B 17/08* (2013.01); *H04N 13/0239* (2013.01)

(58) Field of Classification Search
CPC .... G06T 5/006; G06T 7/002; H04N 13/0246; G02B 13/16; G02B 13/18; G02B 13/002; G02B 17/08
USPC .......................................................... 356/126
See application file for complete search history.

(56) References Cited

U.S. PATENT DOCUMENTS

| | | | | |
|---|---|---|---|---|
| 2,701,501 | A | * | 2/1955 | Cuny ............................ 356/153 |
| 4,245,364 | A | * | 1/1981 | Calleance ........................ 5/680 |

(Continued)

FOREIGN PATENT DOCUMENTS

| | | | |
|---|---|---|---|
| WO | 2007043036 A1 | 4/2007 | |
| WO | WO 2007079639 A1 * | 7/2007 | ................ G03F 9/00 |

(Continued)

OTHER PUBLICATIONS

F. Devernay & O. Faugeras, "Straight Lines Have to be Straight", 13 Machine Vision & Applications 14-24 (Mar. 26, 2008).*

(Continued)

*Primary Examiner* — David N Werner
(74) *Attorney, Agent, or Firm* — D. Kligler IP Services Ltd.

(57) ABSTRACT

An optical apparatus includes an image sensor, which outputs a signal responsively to an optical image formed on the image sensor. Objective optics focus optical radiation from an object so as to form the optical image on the image sensor, while superimposing a characteristic structure on the optical image. A processor processes the signal so as to generate an electronic image of the object while detecting, responsively to the characteristic structure, a deviation in an alignment of the objective optics relative to the image sensor.

16 Claims, 3 Drawing Sheets (51) Int. Cl.
*H04N 13/02* (2006.01)
*H04N 17/00* (2006.01)
*G06T 5/00* (2006.01)
*G02B 17/08* (2006.01)

(56) References Cited

U.S. PATENT DOCUMENTS

| | | | | |
|---|---|---|---|---|
| 4,298,944 A | * | 11/1981 | Stoub et al. | 382/274 |
| 5,004,328 A | * | 4/1991 | Suzuki | G02B 3/00 |
| | | | | 348/E5.027 |
| 5,130,845 A | | 7/1992 | Ruben | |
| 5,239,339 A | | 8/1993 | Ziegler | 355/43 |
| 5,768,443 A | * | 6/1998 | Michael et al. | 382/294 |
| 5,878,174 A | * | 3/1999 | Stewart et al. | 382/293 |
| 6,002,525 A | * | 12/1999 | Poulo et al. | 359/642 |
| 6,320,644 B1 | * | 11/2001 | Simpson et al. | 355/53 |
| 6,618,494 B1 | | 9/2003 | Nonay et al. | 382/132 |
| 7,381,503 B2 | | 6/2008 | Smith et al. | 430/5 |
| 7,536,053 B2 | * | 5/2009 | Davidson-Sokal et al. | 382/218 |
| 8,125,406 B1 | * | 2/2012 | Jensen | G02B 27/017 |
| | | | | 345/7 |
| 8,330,720 B2 | * | 12/2012 | Gao | 345/163 |
| 8,395,783 B2 | * | 3/2013 | Donaher et al. | 356/614 |
| 2002/0164083 A1 | | 11/2002 | Song et al. | 382/275 |
| 2003/0048436 A1 | * | 3/2003 | Kitabayashi et al. | 356/124 |
| 2003/0118227 A1 | * | 6/2003 | Winsor et al. | 382/132 |
| 2004/0032653 A1 | * | 2/2004 | Gohman | G02B 13/16 |
| | | | | 359/434 |
| 2006/0163446 A1 | * | 7/2006 | Guyer | G01S 3/781 |
| | | | | 250/203.1 |
| 2006/0176580 A1 | * | 8/2006 | Kirkham | G02B 13/16 |
| | | | | 359/738 |
| 2007/0139793 A1 | * | 6/2007 | Kawada | G02B 13/06 |
| | | | | 359/740 |
| 2008/0088527 A1 | * | 4/2008 | Fujimori | G02B 27/01 |
| | | | | 345/7 |
| 2010/0007717 A1 | | 1/2010 | Spektor et al. | |
| 2012/0126001 A1 | * | 5/2012 | Justice et al. | 235/404 |
| 2013/0127986 A1 | * | 5/2013 | Richards | G02B 27/0075 |
| | | | | 348/40 |

FOREIGN PATENT DOCUMENTS

WO    2007105205 A2    9/2007
WO    2008120217 A2    10/2008

OTHER PUBLICATIONS

Z. Zhang, "On the Epipolar Geometry Between Two Images With Lens Distortion", 1 Proceedings of the 13th Int'l Conf. on Pattern Recognition 407-411 (Aug. 1996).*

Hartley, R.I., "In Defense of the Eight-Point Algorithm", IEEE Transactions on Pattern Analysis and Machine Intelligence, vol. 19, No. 06, pp. 580-593, Jun. 1997.

* cited by examiner

AUTOMATIC DETECTION OF LENS DEVIATIONS

CROSS-REFERENCE TO RELATED APPLICATIONS

This application claims the benefit of U.S. Provisional Patent Application 61/376,389, filed Aug. 24, 2010, which is incorporated herein by reference.

FIELD OF THE INVENTION

The present invention relates generally to optical imaging systems, and particularly to detection of and correction for deviations in such systems.

BACKGROUND

Many optical systems use a reticle—a pattern of fine lines, typically positioned in a focal plane of the system—for purposes of alignment, focusing and/or measurement. Reticles are most commonly used in the eyepieces of sighting devices, such camera viewfinders, telescopes and microscopes.

For example, U.S. Pat. No. 5,130,845, whose disclosure is incorporated herein by reference, describes a real image viewfinder with an objective having movable focusing lenses, a field lens, an eyepiece lens and image inverting optics. The field lens surface is at the focus of the eyepiece lens. A reticle pattern is located on the field lens surface. Since the objective forms a focus at the location of the reticle, observation of the reticle indicates when the objective is focused.

SUMMARY

Embodiments of the present invention that are described hereinbelow provide apparatus and methods that can be used to detect and correct for deviations of alignment in electronic imaging systems.

There is therefore provided, in accordance with an embodiment of the present invention, optical apparatus, including an image sensor, which is configured to output a signal responsively to an optical image formed on the image sensor. Objective optics are configured to focus optical radiation from an object so as to form the optical image on the image sensor, while superimposing a characteristic structure on the optical image. A processor is coupled to process the signal so as to generate an electronic image of the object while detecting, responsively to the characteristic structure, a deviation in an alignment of the objective optics relative to the image sensor.

The deviation may include a change in centering of the objective optics with respect to the image sensor relative to a default center of the alignment and/or a change in an effective focal length of the objective optics.

In some embodiments, the characteristic structure includes a pattern of calibration marks appearing in the optical image, and the processor is configured to detect the deviation by extracting respective locations of the calibration marks from the electronic image. In one embodiment, the objective optics have an intermediate focus and include, at the intermediate focus, a reticle containing the pattern. In another embodiment, the objective optics include a final surface in proximity to the image sensor, wherein the pattern is formed on the final surface.

In other embodiments, the characteristic structure includes a distortion imposed on the optical image by the objective optics, and the processor is configured to detect the deviation by identifying a change in the distortion. Typically, the processor is configured to match pairs of points, each pair including an image point in the optical image and a corresponding point in an epipolar plane of the apparatus, and to find the change in the distortion using the matched pairs of the points. Typically, the processor is configured to estimate the distortion by finding a transformation of the pairs of the points that satisfies an epipolar constraint. The processor may be configured to create a three-dimensional map of the object based on the pairs of the points in the optical image.

In a disclosed embodiment, the apparatus includes a projection module, which is configured to project a pattern of the optical radiation onto the object, and the processor is configured to process the pattern appearing in the electronic image while correcting for the deviation in the alignment in order to generate a three-dimensional (3D) map of the object.

In another embodiment, the processor is configured to identify a contour in the electronic image corresponding to a presumed shape of the object, and to find distortion correction parameters by comparing the identified contour to the presumed shape.

There is also provided, in accordance with an embodiment of the present invention, a method for imaging, which includes focusing optical radiation from an object via objective optics onto an image sensor so as to form an optical image on the image sensor, while superimposing on the optical image a structure that is characteristic of the objective optics. A signal that is output by the image sensor is processed so as to generate an electronic image of the object while detecting, responsively to the characteristic structure, a deviation in an alignment of the objective optics relative to the image sensor.

The present invention will be more fully understood from the following detailed description of the embodiments thereof, taken together with the drawings in which:

DETAILED DESCRIPTION OF EMBODIMENTS

Overview

In typical machine vision systems, a processor identifies certain features in an electronic image of an object of interest, and then processes these features in order to extract characteristics of the object. For example, in a pattern-based three-dimensional (3D) mapping system, patterned illumination is projected onto an object, and the processor uses the locations of points in the pattern appearing in an image of the object in order to compute a 3D map of the object. Typically, the processor compares the location of each point in the pattern to a corresponding reference location, and uses the offset to calculate the depth coordinates by triangulation.

This sort of computation is sensitive to deviations in the alignment of the objective optics, which focus optical radiation from the object so as to form an optical image of the pattern, relative to the image sensor that converts this optical image into the electronic image signal that is used by the processor. Deviations such as decentering of the optics and changes in their effective focal length (due to temperature variations, for example) can distort the image of the pattern, leading to errors in computation of the 3D coordinates. This problem is in no way limited to pattern-based 3D mapping systems, and similarly affects other types of 3D mapping systems, such as stereoscopic systems, as well as machine vision systems of other sorts.

Embodiments of the present invention that are described hereinbelow address this problem using "self-calibrating" objective optics, which superimpose a characteristic structure on the optical image. The image processor identifies this structure in the electronic image and uses the identified structure to detect and quantify deviations in the alignment of the objective optics relative to the image sensor. The processor may then correct the electronic image (or information extracted from the electronic image, such as depth coordinates) to compensate for the deviations.

In some embodiments, the characteristic structure that is superimposed by the optics comprises a pattern of calibration marks, which appear in the optical image formed by the optics. The processor detects deviations in the alignment of the objective optics by extracting the locations of the calibration marks from the electronic image and comparing their locations to a calibration baseline. The pattern may be imposed on the image, for example, by a reticle at an intermediate focus of the optics or as a shadow cast by opaque marks on a final surface of the optics, in proximity to the image sensor.

In other embodiments, the characteristic structure that is superimposed by the optics comprises a certain distortion that is imposed on the optical image by the objective optics. In other words, the pattern in this case is embodied in the locations of points in the optical image itself, relative to their corresponding locations in a reference image (which may be either a reference image stored in memory or the second image in a stereo pair)[, and the processor detects the deviation in the alignment of the objective optics by identifying changes in the distortion. Typically, in these embodiments, the objective optics are designed intentionally with known, strong distortion, which is then corrected by the processor by applying a suitable correction function to the electronic image using. Deviations in the alignment cause changes in the distortion, which are detected the processor. The processor finds the new deviation parameters by updating the correction function to correct for the changed distortion.

System Description

Figure 1:
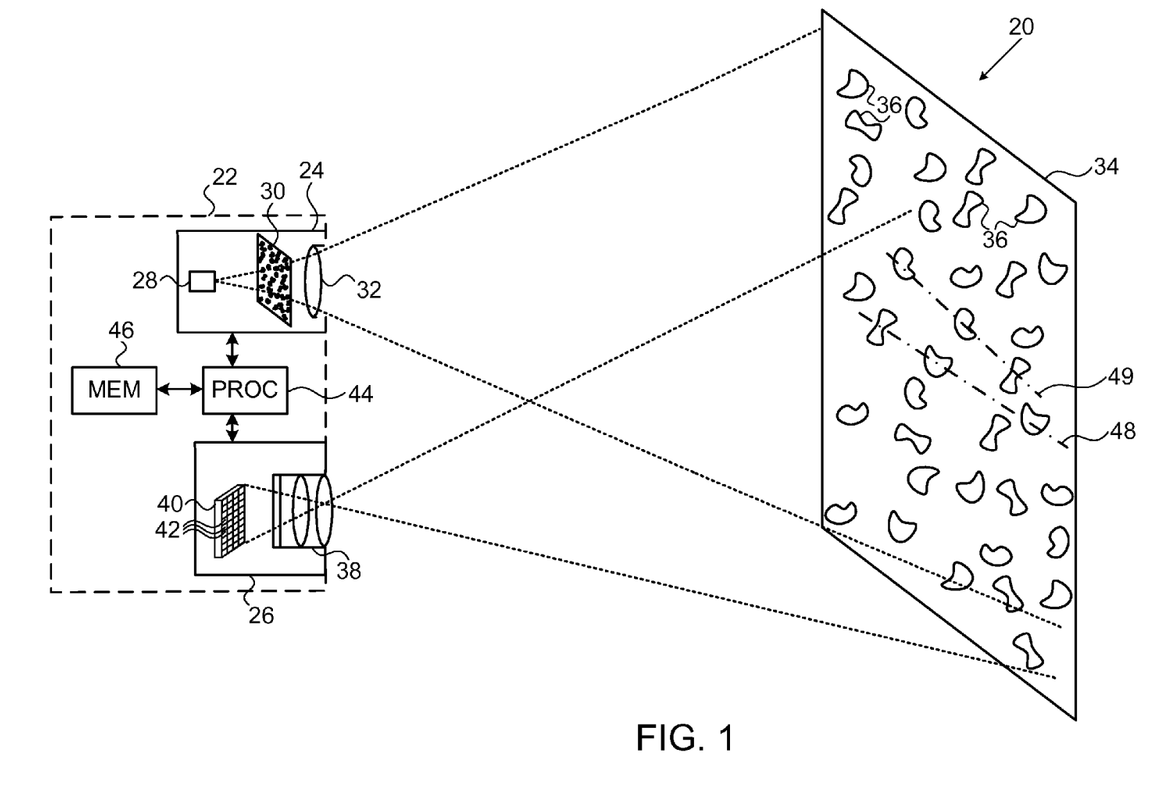
FIG. 1 is a schematic top view of a system for three-dimensional (3D) mapping, in accordance with an embodiment of the present invention.

FIG. 1 is a schematic top view of a system 20 for 3D mapping, in accordance with an embodiment of the present invention. System 20 is based on 3D imaging device 22, comprising a projection module 24, which projects a pattern of optical radiation (visible, infrared, and/or ultraviolet) onto an object 34. (Object 34 is shown in FIG. 1 as a flat sheet solely for the sake of simplicity.) Module 24 comprises a radiation source 28, which emits a beam of optical radiation through a patterned element 30, such as a suitable transparency, microlens array, diffractive optical element (DOE) or diffuser, for example. Projection optics 32 focus the radiation onto object 34, thus creating a pattern of spots 36. (Lines 48, 49, which are defined by the locations of certain spots 36, are referred to in the description of distortion-based alignment methods below.)

An imaging module 26 comprises objective optics 38, which form an optical image of object 34 (and specifically of the pattern appearing on the object) on an image sensor 40, such as a CMOS or CCD image sensor, comprising a matrix of detector elements 42. Image sensor 40 outputs an electronic image signal to a processor 44, which thus generates and processes an electronic image of object 34. Specifically, processor 44 processes the pattern of spots 36 that appears in the electronic image, typically in comparison to reference pattern information that is stored in a memory 46, in order to generate a three-dimensional (3D) map of the object. At the same time, processor 44 detects and corrects for deviations in the alignment of optics 38 relative to image sensor 40, as described in detail hereinbelow.

Processor 44 typically comprises a general-purpose computer processor, with suitable input/output interfaces, which is programmed in software to perform the functions that are described herein. Additionally or alternatively, at least some of these functions may be carried out by special-purpose logic circuits. A processor suitable for carrying out the 3D mapping functions of processor 44 is described, for example, in U.S. Patent Application Publication 2010/0007717, whose disclosure is incorporated herein by reference. Other aspects of pattern-based 3D mapping that may be applied in system 20 are described in PCT International Publications WO 2007/043036, WO 2007/105205 and WO 2008/120217, whose disclosures are also incorporated herein by reference.

System 20 and the elements of device 22 are shown here by way of example, in order to illustrate how the principles of the present invention relating to detection of deviations from alignment can be used in a specific machine vision application. These principles, however, are in no way limited to pattern-based 3D mapping and may similarly be applied in other types of 3D mapping, as well as in other machine vision and electronic imaging systems in which precise alignment is a matter of concern. These principles may be applied in substantially any imaging system that uses parallax, including even single-camera systems in which the camera is translated to take several pictures in a row. "Alignment," in the context of the present patent and in the claims, refers to the spatial and optical relations between an image sensor and objective optics that focus optical radiation onto the image sensor, including (but not limited to) the effective focal length of the optics and decentering, i.e., transverse displacement of the optics relative to the image sensor.

Objective Optics with Calibration Marks

Figures 2, 3:
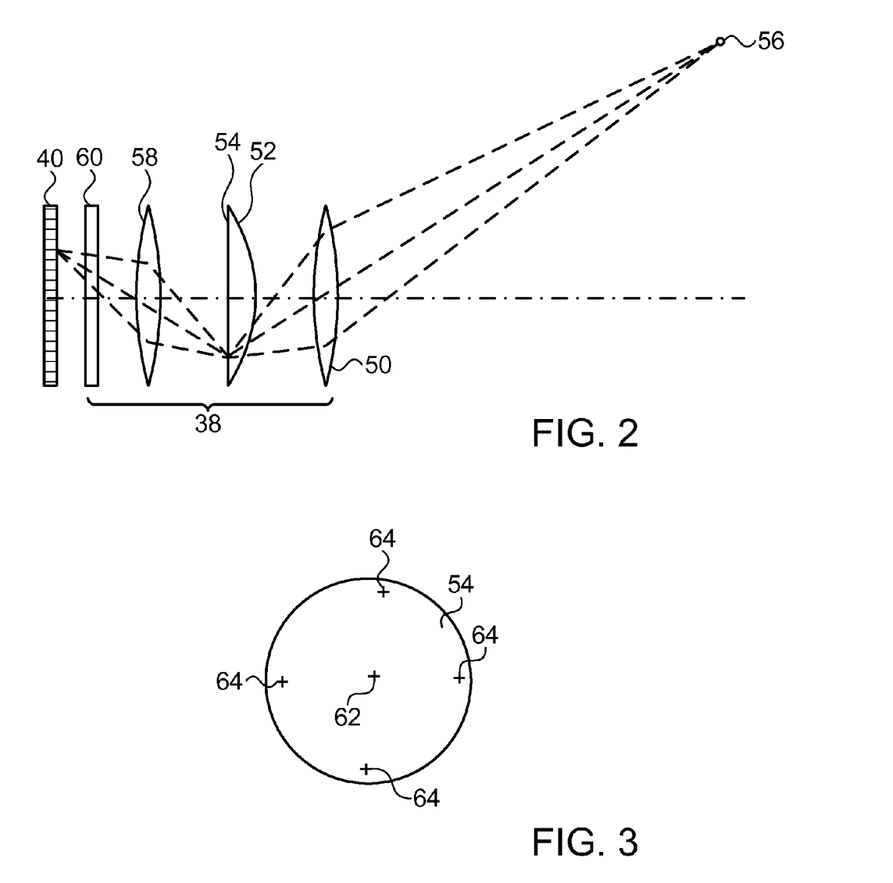
FIG. 2 is a schematic side view of an imaging module, in accordance with an embodiment of the present invention.
FIG. 3 is a schematic frontal view of a reticle, in accordance with an embodiment of the present invention.

FIG. 2 is a schematic side view showing details of imaging module 26, including objective optics 38 and image sensor 40, in accordance with an embodiment of the present invention. Optics 38 comprise an object lens 50, which images object points 56 to an intermediate focal plane. In the present example, the optics are designed so that this focal plane coincides with a surface 54 of a field lens 52, which may be marked with a reticle pattern of calibration marks, as shown in FIG. 3. Alternatively, the calibration marks may be provided on a separate element at the intermediate focus, not connected to any of the lenses. An imaging lens 58 focuses the optical image from the intermediate focus onto image sensor 40. As the reticle pattern is located in this same intermediate focal plane, lens 58 images the pattern onto sensor 40 together with the image of object points 56.

The light may be focused through an optical filter 60, such as an infrared cutoff filter or a bandpass filter. The back surface of filter 60, in proximity to image sensor 40, is the final surface of optics 38. Alternatively, the final surface may belong to one of the lenses in the objective optics. In an alternative embodiment, the final surface (of the filter or other optical element) is marked with a pattern of calibration marks.

The particular design of objective optics 38 in FIG. 2 is shown solely for the purpose of illustrating how and where patterns of calibration marks can be placed in such optics. Alternative optical designs and placements of the calibration marks will be apparent to those skilled in the art and are considered to be within the scope of the present invention. Furthermore, although optics 38 are shown in FIG. 2 as comprising only refractive elements, similar marking schemes may be used in objective optics comprising reflective and/or diffractive elements.

FIG. 3 is a schematic frontal view of a reticle formed, in this example, on surface 54 of field lens 52, in accordance with an embodiment of the present invention. The reticle comprises a pattern of calibration marks 62, 64, which are typically located at the center and several peripheral points on surface 54. The marks may be made by any suitable method that is known in the art, such as etching fine grooves or printing marks on the surface. Although certain specific marks and locations are shown in FIG. 3, the reticle may comprise other types of marks and other sets of locations of the marks.

Figure 4:
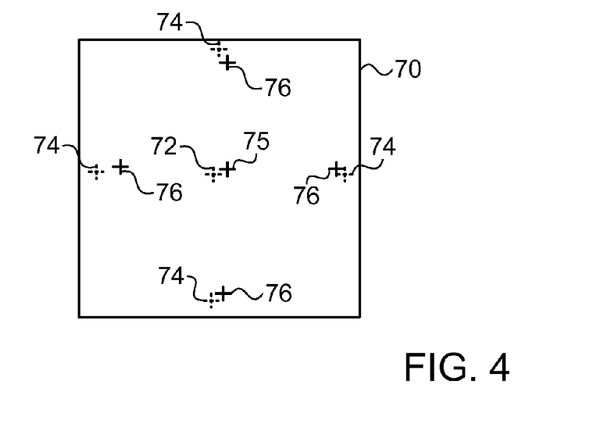
FIG. 4 is a schematic representation of an electronic image showing changes in the locations of calibration marks due to alignment deviation, in accordance with an embodiment of the present invention.

FIG. 4 is a schematic representation of an electronic image 70 formed by the objective optics 38 shown in FIGS. 2 and 3, in accordance with an embodiment of the present invention. Prior to capturing image 70, a calibration image is stored in memory 46 (FIG. 1), containing default locations 72, 74 corresponding to the images of calibration marks 62, 64 (FIG. 3). These default locations may be found during an initial calibration procedure, at the time of production of module 26, for example, or they may be defined based on the design parameters of module 26. Marks 75, 76 in image 70 show the actual locations of the images of calibration marks 62, 64 in the captured image.

Marks 75, 76 are typically superimposed on the images of object 34 that module 26 captures. While processing these images to create 3D maps of the object (based on the locations of spots 36), processor 44 may concurrently extract the locations of marks 75, 76. The features of object 34 are omitted from FIG. 4, however, for the sake of simplicity.

Processor 44 measures the displacement of mark 75 relative to default location 72 (as well as the overall displacement of the other marks), and detects on this basis that optics 38 has become decentered. Furthermore, marks 76 are closer together than default locations 74, indicating that the magnification of optics 38 has decreased and thus that the equivalent focal length (EFL) of optics 38 has changed. Processor 44 uses the shift and scaling of marks 75 and 76 relative to the default locations in order to compute correction factors to be applied in processing images of object 34. The processor typically applies these correction factors to images of object 34, in order to correct the locations of spots 36 in the image to compensate for the deviations (decentering and altered EFL) that it detected in optics 26. As a result, the accuracy of the 3D maps produced by device 22 is maintained notwithstanding the optical deviations. Alternatively, processor 44 may compute and apply appropriate corrections to the depth coordinates themselves.

Marks 62, 64 may be made thin, in order to minimize the interference caused by the corresponding image marks 75, 76 in capture and processing of the images of object 34. Because marks 62, 64 are stationary, while the image of object 34 generally changes from frame to frame, multiple images can be averaged in order to generate a clear image of marks 75, 76. Super-resolution techniques that are known in the art may then be used to find the locations of marks 75, 76 with subpixel accuracy if needed.

Alternatively, as noted earlier, marks 62, 64 may be created on other surfaces in optics 38. For example, opaque marks may be made on the final surface of optics (the back surface of filter 60 in the example shown in FIG. 2) and will cast corresponding shadows on image sensor 40. These shadows will appear as dark elements in the electronic images produced by processor 44. Changes in the locations of the shadows in the images, relative to their default locations, are indicative of decentering of the lens. This arrangement, however, is relatively insensitive to changes in the effective focal length. Alternatively or additionally, the location of marks 62, within optics 38 may be chosen, based on optical design parameters, to maximize the change in the locations of their images that may occur due to the effect of temperature changes on effective focal length, for example.

Using Distortion to Detect Optical Deviations

Figure 5:
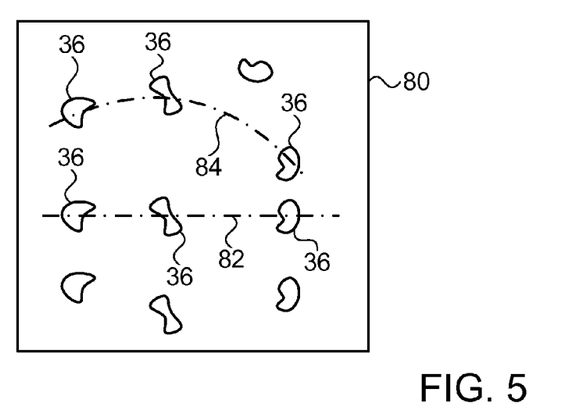
FIG. 5 is a schematic representation of an electronic image showing locations of spots in a pattern appearing in the image, in accordance with an embodiment of the present invention.

FIG. 5 is a schematic representation of an electronic image 80 captured by system 20, showing locations of spots 36 in a pattern appearing in the image, in accordance with an embodiment of the present invention. Straight lines 48 and 49 in the projected pattern (FIG. 1) are converted into contours 82, 84, whose curvature is determined by distortion by objective optics 38. In this example, contour 82, which passes radially through the approximate center of the field of view of optics 38, remains approximately straight, but contour 84 is curved due to barrel distortion. Lines 48, 49 and contours 82, 84 are shown by way of illustration, and are not required for implementation of the method described below, which operates by finding correspondences between image features of any sort. As noted earlier, this method may be applied in stereoscopic imaging systems, as well as pattern-based systems.

Although optical systems are usually designed to minimize distortion, optics 38 in this embodiment are intentionally designed to impose a strong characteristic distortion on the image that they cast on image sensor 40. The distortion is known and invertible, i.e., processor 44 applies an inverse digital warping to the electronic images that it generates in order to remove the distortion. Deviations in the alignment of optics 38 (including decentering and changes in the effective focal length) lead to changes in the effect of the optical distortion on the image. By processing the image signals provided by sensor 40, as explained below, processor 44 is able to detect and correct for the changes in the distortion, and thus to detect and correct for the associated alignment deviations that led to these changes.

In a 3D mapping system, such as system 20, processor 44 may use the geometry of the system both to create the 3D map of object 34 and to detect and correct for changes in distortion. This geometry is characteristic of both stereoscopic 3D mapping systems, in which two cameras form images of the same region in space, and pattern-based 3D mapping systems, in which a projection module projects a pattern onto a region in space, and an imaging module forms an image of the region. Both types of systems create the 3D map using triangulation between pairs of points that are matched by the processor: In stereoscopic systems, each pair comprises a respective point in the image plane of each camera, wherein both image points map to the same object point in space. In pattern-based systems, such as system 20, each point in the image plane of imaging module 26 is matched with a corresponding point in the object plane of projection module 24. Specifically in system 20, a point in the image plane of module 26 that images a given spot 36 on object 34 is paired with a corresponding point in the pattern at the focal plane of lens 32. Each such pair of points and the corresponding point on object 34 define an epipolar plane, as is known in the art.

To formalize the relationship between the pairs of points, let $C_i$ and $C_j$ denote the images formed by cameras i and j (defined as matrices of pixels) in a stereoscopic system, or equivalently denote the object pattern of projection module 24 and the image captured by imaging module 26. Let $P^k$ be a point in 3D space on object 34, and let $p_i^k$ denote the imaged coordinate of $P^k$ in the image (or projection object) $C_i$ in homogenous coordinates. Thus, a location $x_i^k, y_i^k$ in the image (or object) plane of $C_i$ is defined as $$p_i^k = \begin{pmatrix} x_i^k \\ y_i^k \\ 1 \end{pmatrix}.$$

In a system without distortion, any given pair of points $(p_i^k, p_j^k)$ satisfies the epipolar constraint, i.e., there exists a 3×3 matrix F such that for every pair of corresponding points in the system, $$p_i^{k^T} F p_j^k = 0. \qquad (1)$$

F is commonly known as the "fundamental matrix." This linear relationship (linear in F) means that any point $p_i^k$ in $C_i$ is mapped to a line $l^\tau = p_i^{k^T} F$ in $C_j$. Various methods are known in the art for computing the fundamental matrix. For example, the well-known "eight-point algorithm" computes the fundamental matrix from a set of eight (or more) pairs of points. This algorithm is described by Hartley in "In Defense of the Eight-Point Algorithm," *IEEE Transactions on Pattern Analysis and Machine Intelligence* 19:6 (1997), pages 580-593, which is incorporated herein by reference.

In the present embodiment, however, as illustrated in FIG. 5, the epipolar constraint will be violated due to the intentional distortion of lens 38, and the result of equation (1) will therefore be non-zero in general. The distortion of lens 38 is known, however, and can be corrected by processor 44 using an appropriate transformation to give undistorted coordinates $x_j^{\prime k}, y_j^{\prime k}$.

For example, processor 44 may apply a polynomial transformation of the following general form, with calibration coefficients $a_{mn}$, $b_{mn}$:

$$x_j^{\prime k} = \Sigma_{m,n} a_{mn} (x_j^k)^m (y_j^k)^n$$

$$y_j^{\prime k} = \Sigma_{m,n} b_{mn} (x_j^k)^m (y_j^k)^n \qquad (2)$$

In equations (2), the zero-order coefficients $a_{00}$ and $b_{00}$ correspond to the decentering of optics 38, while the remaining coefficients are dependent, inter alia, on the equivalent focal length (EFL).

Processor 44 finds the matrix F and the coefficients $a_{mn}$ and $b_{mn}$ by a process of optimization, which seeks to minimize an error function of the form:

$$\text{error}(EFL, \text{center}) = \min_F \Sigma_k \left| p_i^{\prime k^T} F p_j^{\prime k} \right|^\alpha \qquad (3)$$

wherein a is a positive number and |F|=1, and wherein $$p_i^{\prime k} = \begin{pmatrix} x_i^{\prime k} \\ y_i^{\prime k} \\ 1 \end{pmatrix}$$

represents the point coordinates following correction. (If a=2, F can be found by robust least-squares approach.) Once the optimal coefficients are found, they can be used to correct the image point coordinates in order to create an accurate depth map. Processor 44 tests the result of equation (3) from time to time during operation of device 22 in order to verify that the error remains within acceptable bounds. An increase in the error may indicate that a deviation has occurred in the alignment of optics 38.

Figure 6:
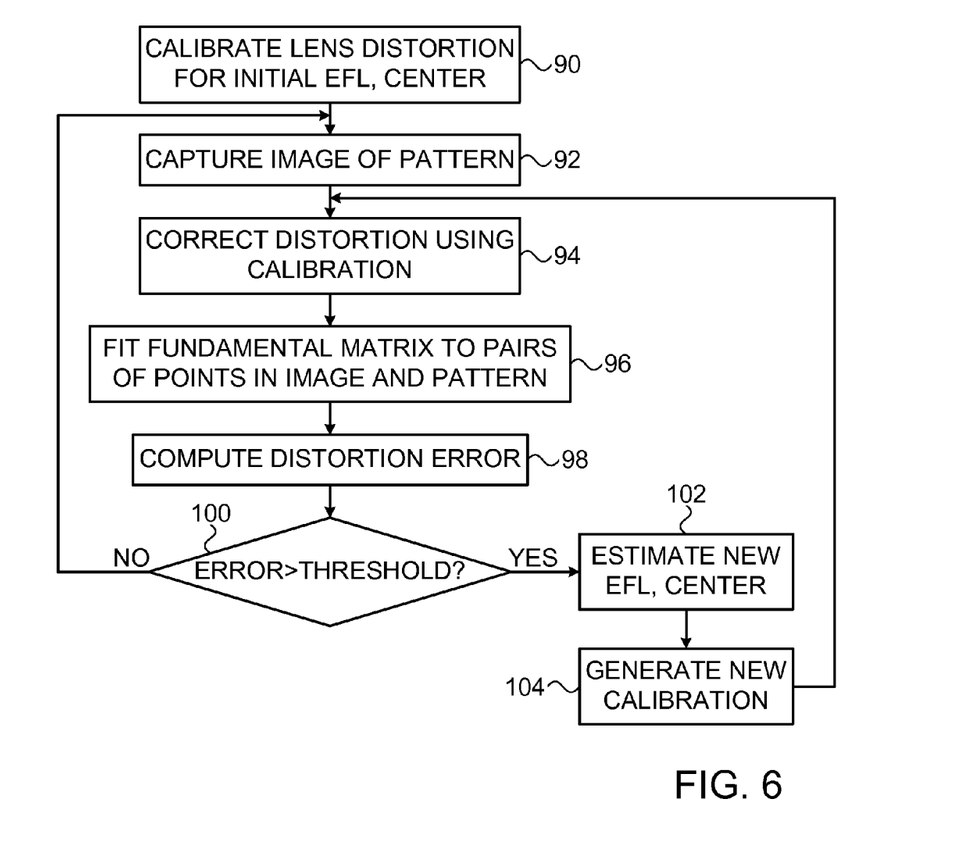
FIG. 6 is a flow chart that schematically illustrates a method for calibrating lens distortion, in accordance with an embodiment of the present invention.

FIG. 6 is a flow chart that schematically illustrates a method for calibrating lens distortion based on the principles explained above, in accordance with an embodiment of the present invention. The method is described, for the sake of clarity, in the specific context of system 20, but it may similarly be applied in any sort of triangulation-based imaging system, as explained above.

At the time of production or startup of system 20, processor 44 computes initial values of the calibration coefficients $a_{mn}$, $b_{mn}$ that minimize the error result of equation (3), at a calibration step 90. This calibration may be carried out using a known test target, or it may be performed on an actual object that is to be mapped in system 20, using the process described above. (In other words, device 22 may find pairs of points ($p_i^k$, $p_j^k$) at step and in subsequent steps based on actual, distorted images of the pattern, by calculating correlations between image features, for example, without resorting to special-purpose calibration images and procedures.) Device 22 then proceeds to capture images of the pattern that is projected onto object 34, at an image capture step 92. Processor 44 corrects the distortion of these images using the known calibration coefficients, at a correction step 94. The processor matches points in the rectified images to corresponding reference points in the projected pattern, and finds the offsets between the points in each such pair in order to create a depth map of object 34.

From time to time, processor 44 finds a fundamental matrix F (equation (1)) that fits the pairs of points ($p_i^{\prime k}, p_j^{\prime k}$), at a matrix fitting step 96. The processor may compute the fundamental matrix by applying the eight-point algorithm to the undistorted image points and their corresponding pattern points, for example, or using any other suitable method that is known in the art, such as applying least-squares fitting to a dense pattern correspondence. Processor 44 then computes the error value (equation (3)) using this matrix F, at an error computation step 98. The processor compares the resulting error value to a predefined threshold, at an error checking step 100. If the error is below threshold, the processor concludes that the distortion has not changed substantially, and returns to capture the next image at step 92.

If processor 44 finds at step 100, however, that the error is above the threshold, it concludes that an alignment deviation has occurred and that it is necessary to compute new calibration coefficients to correct for the altered distortion. Additionally or alternatively, processor 44 may monitor and update the internal parameters (such as EFL) continuously in order to minimize the residual error in the least-squares solution for F. The processor may use any suitable method to find the new coefficients. For example, the processor may use image statistics to estimate the changes in the optical center and EFL of optics 38, at a deviation estimation step 102. Additionally or alternatively, the processor may estimate (and then correct for) other distortion components. On this basis, the processor may then make an initial adjustment to the previous coefficients in order to estimate the new coefficients, at a coefficient generation step 104.

Processor 44 returns to step 94 in order to correct the distortion of the image coordinates, and then repeats steps 96 and 98 in order to compute the error value based on the new calibration coefficients. The processor tests the error value at step 100 and, if the error is below threshold, resumes normal operation at step 92 using the updated calibration coefficients to rectify subsequent images. Otherwise, the processor continues through steps 102 and 104 to try new coefficients until a satisfactory calibration is found. Alternatively, processor 44 may continuously update the calibration coefficients from frame to frame without reference to an error threshold.

Alternatively, processor 44 may use aspects of the content of the scene to infer the distortion parameters (such as EFL and lens center). This sort of content-based technique can be applied to images captured from a single viewpoint without resort to epipolar geometries. In such embodiments, processor 44 analyzes the digital-image to extract contours in the image that correspond to objects in the scene that are presumed to have known, characteristic shapes, such as straight lines, circles, right angles and/or planar surfaces. After identifying candidate objects having the desired properties, the processor finds the distortion correction parameters by comparing the extracted contours to the presumed shapes, and specifically by finding the distortion correction parameters that best transform the contours in the image into the presumed object shapes. The distortion can be expressed in terms of a parametric model, as explained above, and the search for the distortion parameters can be performed using optimization techniques that are known in the art.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical apparatus, comprising:
   an image sensor, which is configured to output a signal responsively to an optical image formed on the image sensor;
   objective optics, which are configured to focus optical radiation from an object so as to form the optical image on the image sensor, while intentionally superimposing a known and invertible characteristic distortion on the optical image; and
   a processor, which is coupled to process the signal so as to generate electronic images of the object and to apply an inverse digital warping to the electronic images in order to remove the characteristic distortion, to calibrate an initial distortion of the optical image by matching pairs of points in a first electronic image, each pair comprising an image point in the optical image and a corresponding point in an epipolar plane of the apparatus, to detect a change of the distortion in the optical image relative to the initial distortion using the matched pairs of points in a second electronic image, generated subsequently to the first electronic image, and to identify, responsively to the detected change, a deviation of a spatial or optical relation between the objective optics and the image sensor with respect to an initial alignment of the objective optics relative to the image sensor.

2. The apparatus according to claim 1, wherein the deviation comprises a change in centering of the objective optics with respect to the image sensor relative to a default center of the alignment.

3. The apparatus according to claim 1, wherein the deviation comprises a change in an effective focal length of the objective optics.

4. The apparatus according to claim 1, wherein the processor is configured to estimate the distortion by finding a transformation of the pairs of the points that satisfies an epipolar constraint.

5. The apparatus according to claim 4, wherein the processor is configured to detect the change the distortion by fitting a fundamental matrix to the pairs of the points in the first and second electronic images, and computing an error value of the fundamental matrix in the second electronic image.

6. The apparatus according to claim 1, wherein the processor is configured to create a three-dimensional map of the object based on the pairs of the points in the optical image.

7. The apparatus according to claim 1, and comprising a projection module, which is configured to project a pattern of the optical radiation onto the object, wherein the pairs of points comprise points in the projected pattern.

8. The apparatus according to claim 7, wherein the processor is configured to process the pattern appearing in the electronic image while correcting for the deviation of the spatial or optical relation in order to generate a three-dimensional (3D) map of the object.

9. A method for imaging, comprising:
   focusing optical radiation from an object via objective optics onto an image sensor so as to form an optical image on the image sensor, while intentionally superimposing on the optical image a known and invertible distortion that is characteristic of the objective optics;
   processing a signal that is output by the image sensor so as to generate electronic images of the object and applying an inverse digital warping to the electronic images in order to remove the characteristic distortion;
   calibrating an initial distortion of the optical image by matching pairs of points in a first electronic image, each pair comprising an image point in the optical image and a corresponding point in an epipolar plane;
   detecting a change of the distortion in the optical image relative to the initial distortion using the matched pairs of points in a second electronic image, generated subsequently to the first electronic image; and
   identifying, responsively to the detected change, a deviation of a spatial or optical relation between the objective optics and the image sensor with respect to an initial alignment of the objective optics relative to the image sensor.

10. The method according to claim 9, wherein the deviation comprises a change in centering of the objective optics with respect to the image sensor relative to a default center of the alignment.

11. The method according to claim 9, wherein the deviation comprises a change in an effective focal length of the objective optics.

12. The method according to claim 9, wherein detecting the change in the distortion comprises finding a transformation of the pairs of the points that satisfies an epipolar constraint.

13. The method according to claim 12, wherein finding the transformation comprises fitting a fundamental matrix to the pairs of the points in the first and second electronic images, and wherein detecting the change comprises computing an error value of the fundamental matrix in the second electronic image.

14. The method according to claim 9, wherein processing the signal comprises creating a three-dimensional map of the object based on the pairs of the points in the optical image.

15. The method according to claim 9, and comprising projecting a pattern of the optical radiation onto the object, wherein the pairs of points comprise points in the projected pattern.

16. The method according to claim 15, and comprising processing the pattern appearing in the electronic image while correcting for the deviation in the alignment in order to generate a three-dimensional (3D) map of the object.

\* \* \* \* \*